(12) United States Patent
Hochmuth

(10) Patent No.: US 9,124,620 B2
(45) Date of Patent: Sep. 1, 2015

(54) ESTABLISHING A REMOTE SESSION BETWEEN A RECEIVING STATION AND A SENDING STATION

(75) Inventor: Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1150 days.

(21) Appl. No.: 11/669,366

(22) Filed: Jan. 31, 2007

(65) Prior Publication Data

US 2008/0181209 A1    Jul. 31, 2008

(51) Int. Cl.
*H04L 12/28* (2006.01)
*H04L 29/08* (2006.01)

(52) U.S. Cl.
CPC .............. *H04L 67/141* (2013.01); *H04L 67/14* (2013.01); *H04L 12/2854* (2013.01)

(58) Field of Classification Search
None
See application file for complete search history.

(56) References Cited

U.S. PATENT DOCUMENTS

| 6,976,066 | B1 * | 12/2005 | Mouhanna et al. | 709/223 |
| 7,290,280 | B2 * | 10/2007 | Yeager et al. | 726/14 |
| 7,316,027 | B2 * | 1/2008 | Burch et al. | 726/1 |
| 7,430,664 | B2 * | 9/2008 | Zhu et al. | 713/168 |
| 7,451,217 | B2 * | 11/2008 | Wardrop | 709/225 |
| 2003/0229900 | A1 * | 12/2003 | Reisman | 725/87 |

* cited by examiner

*Primary Examiner* — Timothy J Weidner
(74) *Attorney, Agent, or Firm* — Conley Rose

(57) ABSTRACT

A method is described that comprises a receiving station determining whether at least one sending station (coupled to the receiving station in a peer-to-peer configuration) meets a filtering criterion, and establishing a remote session between the receiving station and a sending station for which the filtering criterion is met.

19 Claims, 5 Drawing Sheets

ESTABLISHING A REMOTE SESSION BETWEEN A RECEIVING STATION AND A SENDING STATION

BACKGROUND

With the proliferation of high speed networks and Internet access, an increasing number of corporate entities now provide their employees with remote access to corporate computers. This allows employees to work from home or other locations during normal working hours (sometimes referred to as telecommuting), as well as after-hours and on weekends. Such remote access to computer resources is provided by a variety of software packages, such as, for example, Remote Desktop Client interaction with Terminal Services, both by Microsoft®. These and other similar software packages provide a single network access point to a collection of terminal sessions or virtual computers. Once logged in, each desktop appears to its respective remote user as the desktop would appear if the user were logged directly onto an actual, distinct computer. In fact, the remote user is logged onto one of a plurality of virtualized machines, all executing on a single server or cluster of servers. In order to support a large number of remote users using a Terminal Services type of solution, powerful and expensive high-speed servers are needed. In high-reliability environments, redundant or clustered servers may be required, increasing the cost even further.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

Figure 1:
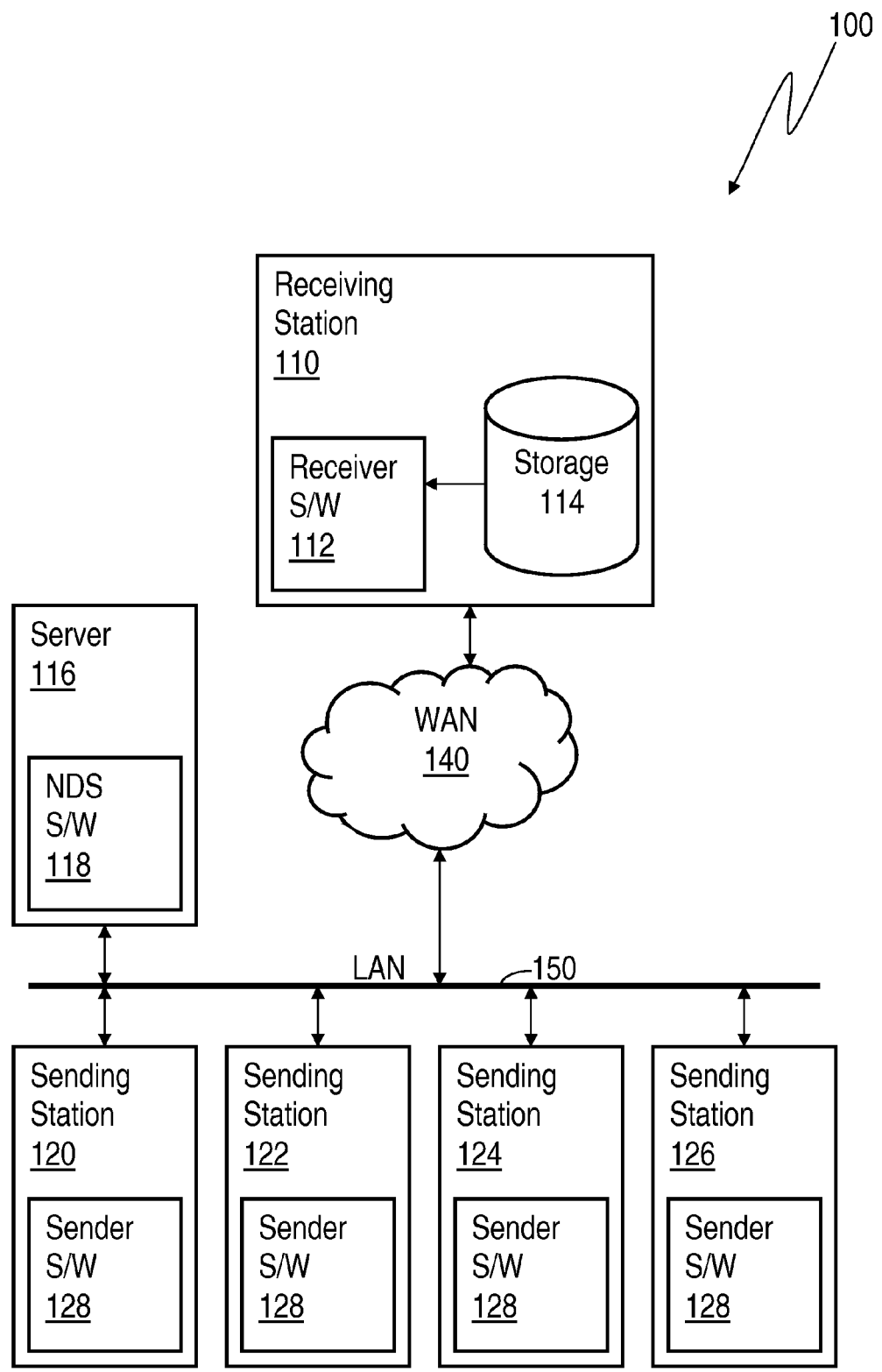
FIG. 1 shows a system comprising a receiving station and a collection of networked sending stations, configured to operate in accordance with at least some illustrative embodiments.

Systems for providing remote access to collections of personal computer resources have increased in popularity in recent years. FIG. 1 shows such a computer system 100, in accordance with at least some illustrative embodiments, in which a receiving station 110 accesses any of a collection of sending stations 120-126. The sending stations 120-126 couple to a local area network (LAN) 150, which in turn couples to a wide area network (WAN) 140. The receiving station thus accesses each of the sending stations 120-126 via both LAN 150 and WAN 140. The receiving system 110 and the sending stations 120 are configured in a "peer-to-peer" configuration. In such a configuration, any one station can communicate with any other station without any one station having to arbitrate or control the transactions of the other stations, as is the case in a client-server configuration. Thus, in such a peer-to-peer configuration, the failure of a single station does not compromise or affect the operation of the other stations within the system.

In at least some illustrative embodiments, receiving station 110 comprises receiver software (Receiver S/W) 112, which in turn comprises executable code running on receiving station 110 and provides the functionality of receiving station 110 as described below. Receiving station 110 also comprises storage device 114, which may optionally be used to store at least some configuration information used by receiver software 112. Similarly, each of sending stations 120-126 comprise an instance of sender software (Sender S/W) 128), which each in turn comprises executable code running on each of sending stations 120-126, and which provides the functionality of sending stations 120-126, also described below. In at least some illustrative embodiments a server 116 also couples to LAN 150. Such a server comprises Network Directory Service software (NDS S/W) 118, which comprises executable code running on server 116. The NDS software optionally provides the receiving station with identification information about each of the sending stations 120-126, as described below.

Continuing to refer to FIG. 1, a user of the receiving station 110 initiates a request for a remote session with one of the remote sending stations 120-126. A remote session is a process by which two computers, a receiving station that initiates the session and a sending station that hosts the session, interact to provide a user at the receiving station with a computing environment that appears to the user as if the user were logged directly into the sending station. The host sending station provides graphical information to the receiving station, which displays the images represented by the information as the images would be displayed at the sending station if the user were logged-in locally to the sending station. Likewise, the user provides inputs to the sending station via input devices coupled to the receiving station (e.g., a keyboard and mouse), and said inputs are received and processed by the sending station in the same manner as inputs provided by a locally logged-in user.

In at least some of the illustrative embodiments described, the remote session request initiated by the user is not directed to a specific sending station. Instead, the receiver software 112, executing within receiving station 110, identifies a sending station that meets one or more operational constraints or "filtering criteria" specified by the user, and establishes a remote session with the first identified sending station that meets the filtering criteria. Receiver software 112 executing within receiving station 110 responds to the user's request by determining a search domain within which to search for a suitable sending station that meets the filtering criteria. In at least some illustrative embodiments, the search domain comprises a list of sending stations which, at a given time, may be available for use by the receiving station 110 as a host to a remote session.

The search domain may be defined in a variety of ways. In at least some illustrative embodiments, for example, the search domain is defined by a file maintained on non-volatile storage device (Storage) 114 within receiving station 110, listing identification information of sending stations 120-126. This information allows receiving station 110 to contact the sending stations 120-126 as described below. In at least some other illustrative embodiments, the search domain is defined by a list of sending stations provided by Network Directory Service software (e.g., NDS S/W 118 executing on server 116). Such software provides identification information similar to that listed in the file maintained on non-volatile storage device 114 described above. The receiving station 110 accesses the information by issuing a query across LAN 150 to server 116, which in turn provides the list of sending stations requested.

In yet other illustrative embodiments, the search domain is defined by a locally cached dynamic list of sending stations compiled using a network discovery query via a network broadcast or multicast mechanism. In such an embodiment, receiver software 112 and sender software 128 each comprise a component capable of issuing and responding to, respectively, such network broadcast and/or multicast queries. The receiver software builds and maintains cached lists of sending stations based upon the responses received to the queries. The list is subsequently used to determine the search domain.

Once a search domain has been determined, receiver software 112 queries each of the sending stations 120-126 across the WAN 140 and LAN 150 to determine if any of the sending stations meets one or more filtering criteria for the requested session. As previously noted, the filtering criteria are provided by the user, and serve as a selection filter used to define a sub-set of sending stations within the search domain that the user will accept as remote session hosts. This selection filter defines one or more operational constraints that the user requires of the sending station hosting the remote session. Each sending station's sender software 128 maintains the status and configuration information for that sending station, and provides such information to the receiver station 110 in response to the query from the receiver software 112. Responses sent by each sender software 128 instance enables receiver software 112 to determine if a filtering criterion has been met. Such criteria may comprise whether or not the sending station is available (i.e., no other user is logged onto the station), whether required software is loaded and available on the sending station, whether the requesting user is already logged onto the sending station (i.e., a request to resume an established session), or any combination of such criteria. Other filtering criteria are possible as well, and all such criteria are within the scope of the present disclosure.

In at least some illustrative embodiments, once a sending station 120-126 within the search domain is located by the receiving station 110 that meets the filtering criteria, the search is complete and the receiving station contacts and enables the user to log onto the identified sending station. Any of a variety of protocols, such as the remote desktop protocol (RDP), may be used to establish the session and exchange data between the receiving station 110 and the selected sending station 120-126, and all such protocols are within the scope of the present disclosure.

Figure 2A:
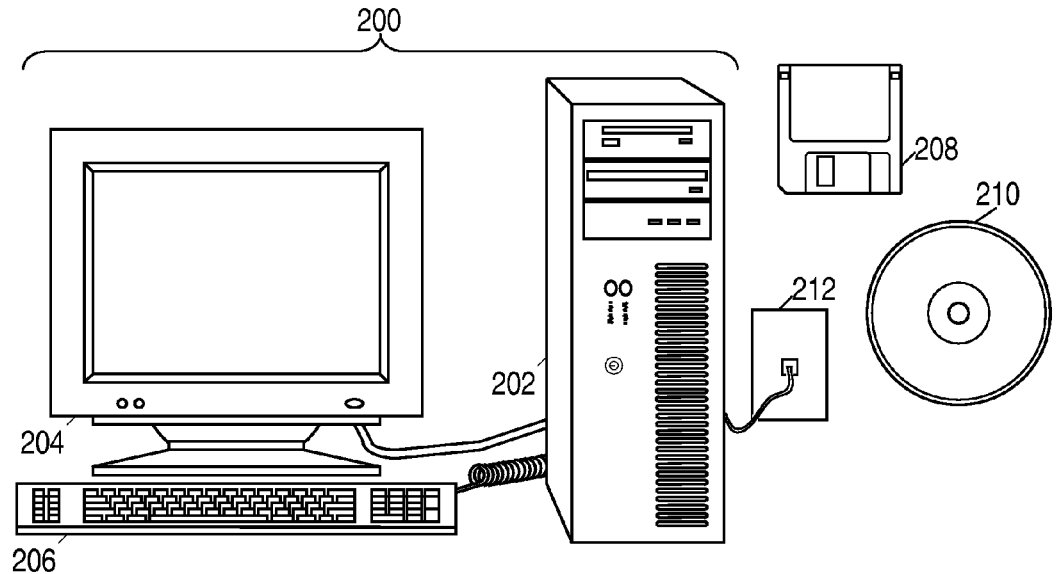
FIG. 2A shows an example of a system configuration, suitable for use as both the receiving and sending stations of FIG. 1, in accordance with at least some illustrative embodiments.
Figure 2B:
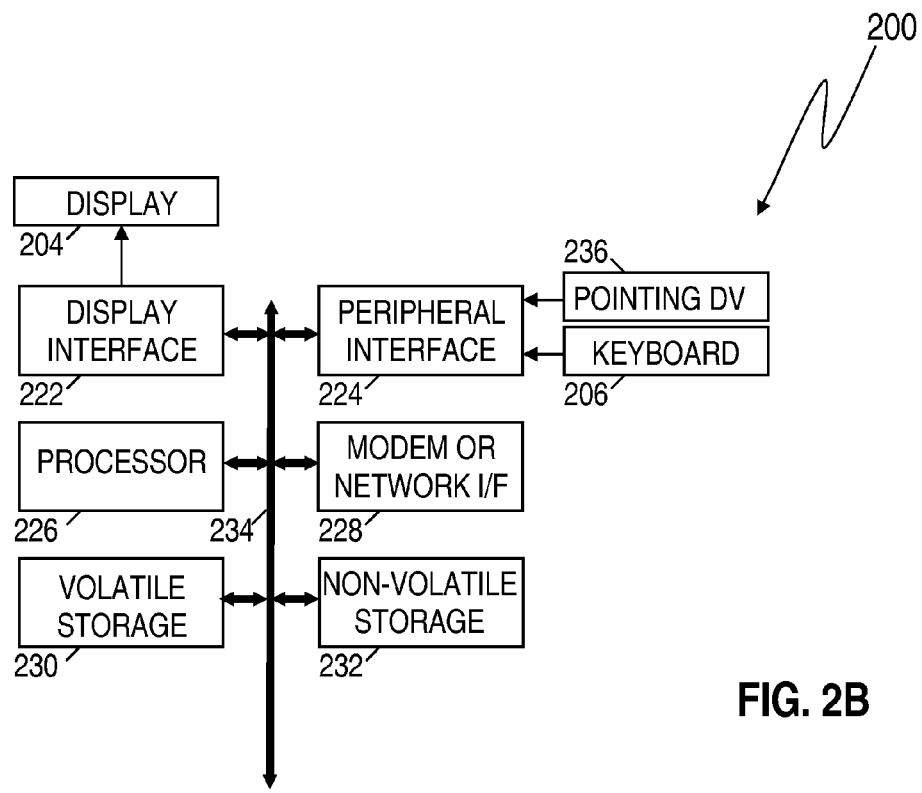
FIG. 2B shows a block diagram of the system configuration of FIG. 2A, in accordance with at least some illustrative embodiments.

FIGS. 2A and 2B show an illustrative system configuration 200 suitable for implementing the receiving station 110 and the sending stations 120-126 of FIG. 1. As shown, the illustrative system configuration 200 comprises a chassis 202, a display 204, and an input device 206. The system configuration 200 comprises a processor 226, volatile storage 230, and non-volatile storage 232. Volatile storage 230 comprises a computer readable medium such as random access memory (RAM). Non-volatile storage 232 comprises a computer readable medium such as flash RAM, read-only memory (ROM), a hard disk drive, a compact disk read-only memory (CD-ROM), and combinations thereof. The computer readable media of both volatile storage 230 and non-volatile storage 232 comprises, for example, software that is executed by processor 226 and provides computer system 100 with some or all of the functionality described herein. The system configuration 200 also comprises a network interface 228 that enables the system 200 to receive information via a local area network and/or a wired or wireless wide area network, represented in FIG. 2A by Ethernet jack 212. A display interface 222 couples to the display 204. A user interacts with the station via the input device 206 and/or pointing device 236 (e.g., a mouse), which couples to a peripheral interface 224. The display 204, together with the input device 236 and/or the pointing device, may together operate as a user interface.

The system configuration 200 may also comprise a display interface 222, a peripheral interface 224 and a bus 234. System 200 may be a bus-based computer, with the bus 234 interconnecting the various elements described in FIG. 2B. The peripheral interface 224 accepts signals from the keyboard 206 and other input devices such as a pointing device 236, and transforms the signals into a form suitable for communication on the bus 234. The display interface 222 may comprise a video card or other suitable display interface that accepts information from the bus 234 and transforms it into a form suitable for the display 204.

The processor 226 gathers information from other system elements, including input data from the peripheral interface 224, and program instructions and other data from non-volatile storage 232 or volatile storage 230, or from other systems (e.g., a server used to store and distribute copies of executable code) coupled to a local area network or a wide area network via the network interface 228. The processor 226 carries out the program instructions and processes the data accordingly. The program instructions may further configure the processor 226 to send data to other system elements, comprising information for the user that may be communicated via the display interface 222 and the display 204. The network interface 228 enables the processor 226 to communicate with other systems via a local area network (e.g., LAN 150 of FIG. 1) or via a wide area network (e.g., WAN 140 of FIG. 1). Volatile storage 230 may serve as a low-latency temporary store of information for the processor 226, and non-volatile storage 232 may serve as a long term (but higher latency) store of information.

The processor 226, and hence the system configuration 200 as a whole, operates in accordance with one or more programs stored on non-volatile storage 232 or received via the network interface 228. The processor 226 may copy portions of the programs into volatile storage 230 for faster access, and may switch between programs or carry out additional programs in response to user actuation of the input device. The additional programs may be retrieved from non-volatile storage 232 or may be retrieved or received from other locations via the network interface 228. One or more of these programs executes on system configuration 200 causing the configuration to perform at least some of the receiving and sending functions of receiving station 110 and sending stations 120-126, respectively, as disclosed herein.

Although a fully equipped computer system is shown in the illustrative embodiment of FIGS. 2A and 2B, other embodiments that comprise less options may be used that are suitable as the receiving station 110. At least some embodiments of receiving station 110 comprise only some of the hardware features shown in FIGS. 2A and 2B, and only execute the software necessary to establish a remote session (sometimes referred to as a "thin" client). Other embodiments of the receiving station, with various combinations of hardware features and installed software, will become apparent to those skilled in the art, and all such embodiments of the receiving station are intended to be within the scope of the present disclosure.

Figure 3:
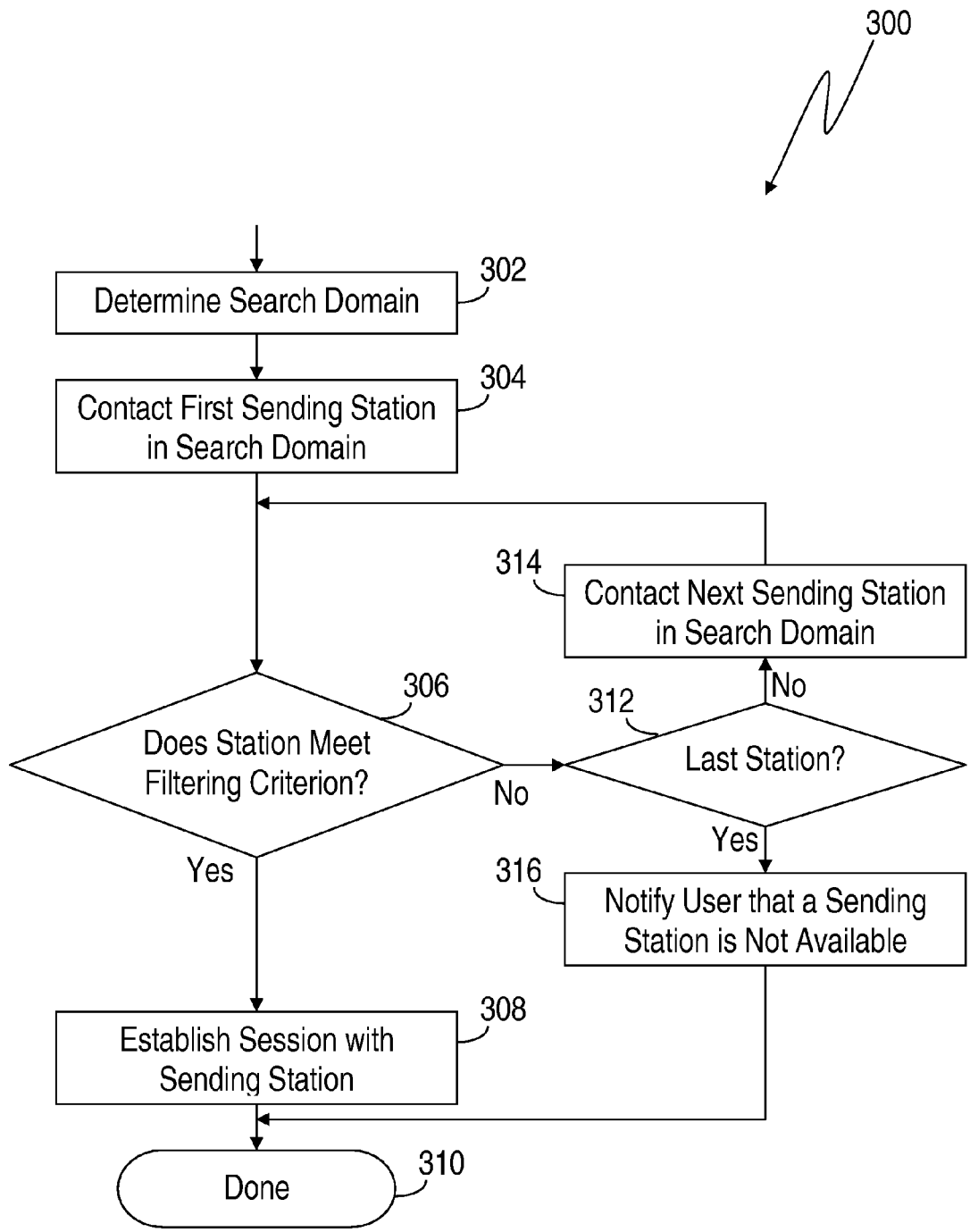
FIG. 3 shows a method implementing a peer-to-peer dynamic allocation of computer systems for use in a remote session, in accordance with at least some illustrative embodiments.

FIG. 3 shows a method 300 suitable for establishing a session between the receiving station 110 and one of the sending stations of FIG. 1, in accordance with at least some illustrative embodiments. After a user initiates a remote session request to a collection of sending stations (e.g., sending stations 120-126 of FIG. 1), a search domain is determined identifying the sending stations to be searched (block 302 of FIG. 3). As previously described, the search domain may be defined in a variety of ways, including using a locally cached list based upon a network discovery mechanism. Such a mechanism may include queries in the form of a broadcast or multicast network query directed to the subnet address of LAN 150 to which the sending stations 120-126 are coupled. A variety of software tools and driver kits may be used to provide such network discovery capabilities (e.g., Bonjour™ by Apple Computer®) and all such software tools and driver kits are intended to be within the scope of the present disclosure.

By utilizing the peer-to-peer configuration of the receiving and sending stations 120-126 to determine the search domain, the need for a terminal server or even an allocation server (used to allocate available sending stations to requesting receiving stations in some systems) is eliminated. A receiving station 110 communicates directly with each sending station 120-126 to determine the search domain, effectively creating a distributed allocation manager. In this manner, computer resources on a network can be utilized as shared resources which are made available to remote users. By making use of otherwise unused or under used computer resources, the additional cost of operating large and expensive terminal servers is avoided, and existing resources are used more effectively.

Continuing to refer to FIG. 3, once the search domain has been determined, the receiving station 110 begins to sequentially contact each sending station 120-126 within the search domain in order to find a sending station that is available and that meets the filtering criterion requested by the user of the receiving station 110. The receiving station 110 contacts the first sending station within the domain (block 304) and checks whether the station meets the filtering criterion (block 306). If the criterion is met, the receiving station 110 establishes a remote session with the selected sending station (block 308) ending the method 300 (block 310). If the criterion is not met (block 306), and there are still sending stations within the search domain to be queried (block 312), the receiving station 110 contacts the next sending station (i.e., a sending station not already contacted during the current attempt to establish a remote session) within the search domain (block 314) and the process is repeated. If the search criterion is not met after the last station within the search domain is contacted (blocks 306 and 312), the user is notified that there are no sending stations available that meets the requested criterion (block 316), ending the method 300 (block 310).

Although the above embodiment of the method 300 describes contacting each station within the domain in some form of a sequential order (e.g., in alphabetical order by station name), other selection and contacting orders, such as random orders, or predefined hierarchical orders are also possible. Thus, for example, the receiving station 110 would attempt to establish a remote session with a higher performance sending station first, a medium performance sending station next, and then other lower performance sending stations as necessary. Other orderings will become apparent to those skilled in the art, and all such orderings are intended to be within the scope of the present disclosure.

Regardless of other filtering criteria requested by the user, a sending station 120-126 must be "available" in order for receiving station 110 to establish a session with the sending station 120-126. In at least some illustrative embodiments, a sending station that is "available" means that no user is logged on to that particular sending station. In at least some other illustrative embodiments, the sending station can compare the user credentials provided by the receiving station to those of a user already logged in. If the credentials match, the sending station is considered "available" with respect to that specific user, and the user is then allowed to re-establish or restore a previously interrupted or suspended session between the receiving station and the sending station.

Figure 4:
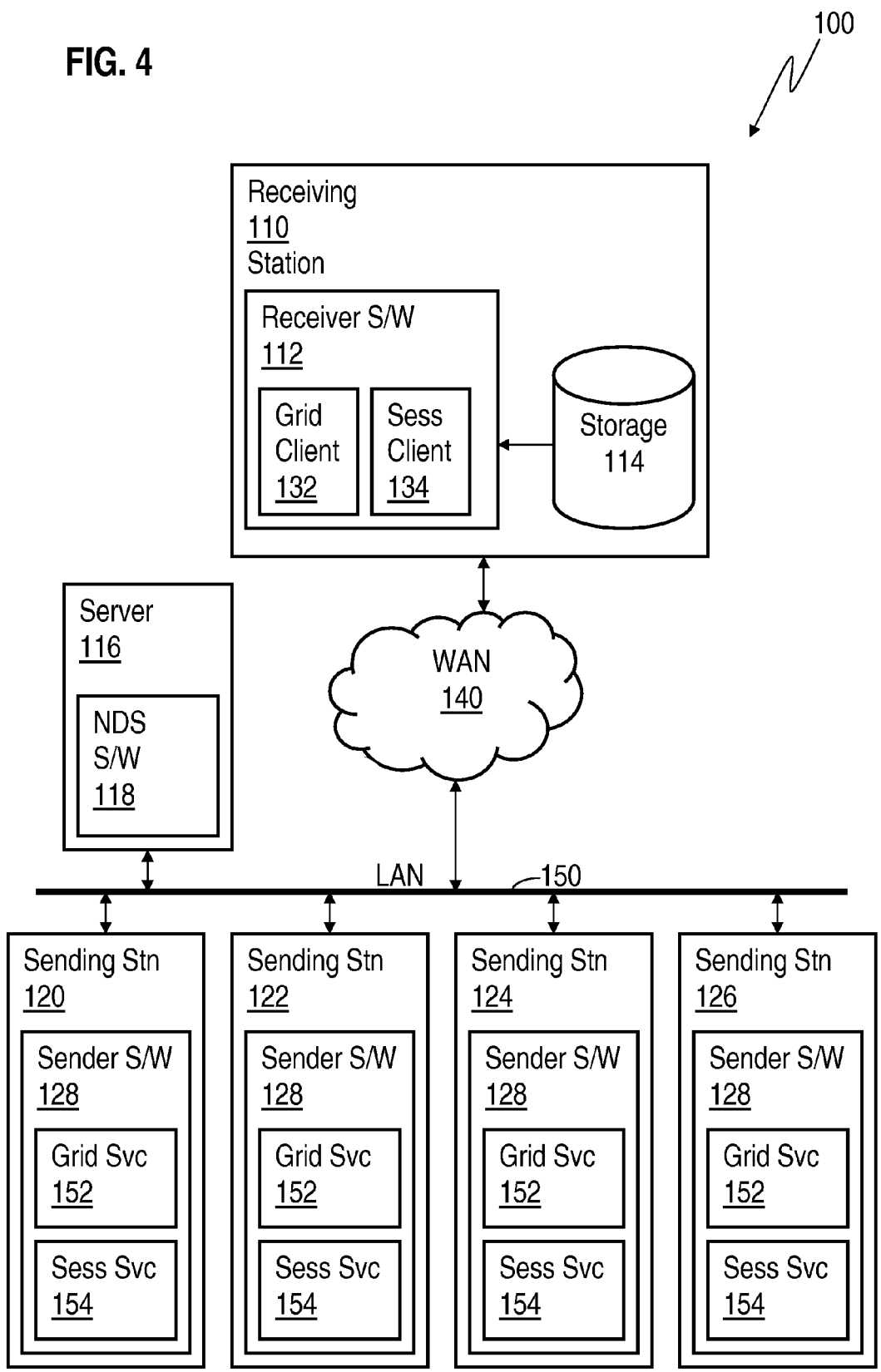
FIG. 4 shows a system comprising receiver and sender software that each comprise multiple software sub-functions, configured to operate in accordance with at least some illustrative embodiments.

In the embodiments described above, receiver software 112 and sender software 128 each incorporate functions associated with determining which sending station 120-126 is suitable for the remote session requested by the user, as well as functions associated with actually establishing the remote session. In at least some illustrative embodiments, these functions may be implemented by separate software modules or sub-functions, as shown in FIG. 4. Thus, for example receiver software 112 may comprise a grid client sub-function (Grid Client) 132, and a session client sub-function (Sess Client) 134, wherein the grid client 132 determines which sending stations are suitable for a remote session, and the session client 134 provides the remote session itself. In such an embodiment, sender software 128 would similarly comprise a grid service sub-function (Grid Svc) 152 that responds to queries from grid client 132, and a session service sub-function (Sess Svc) 154 that responds to queries from session client 134.

Figure 5:
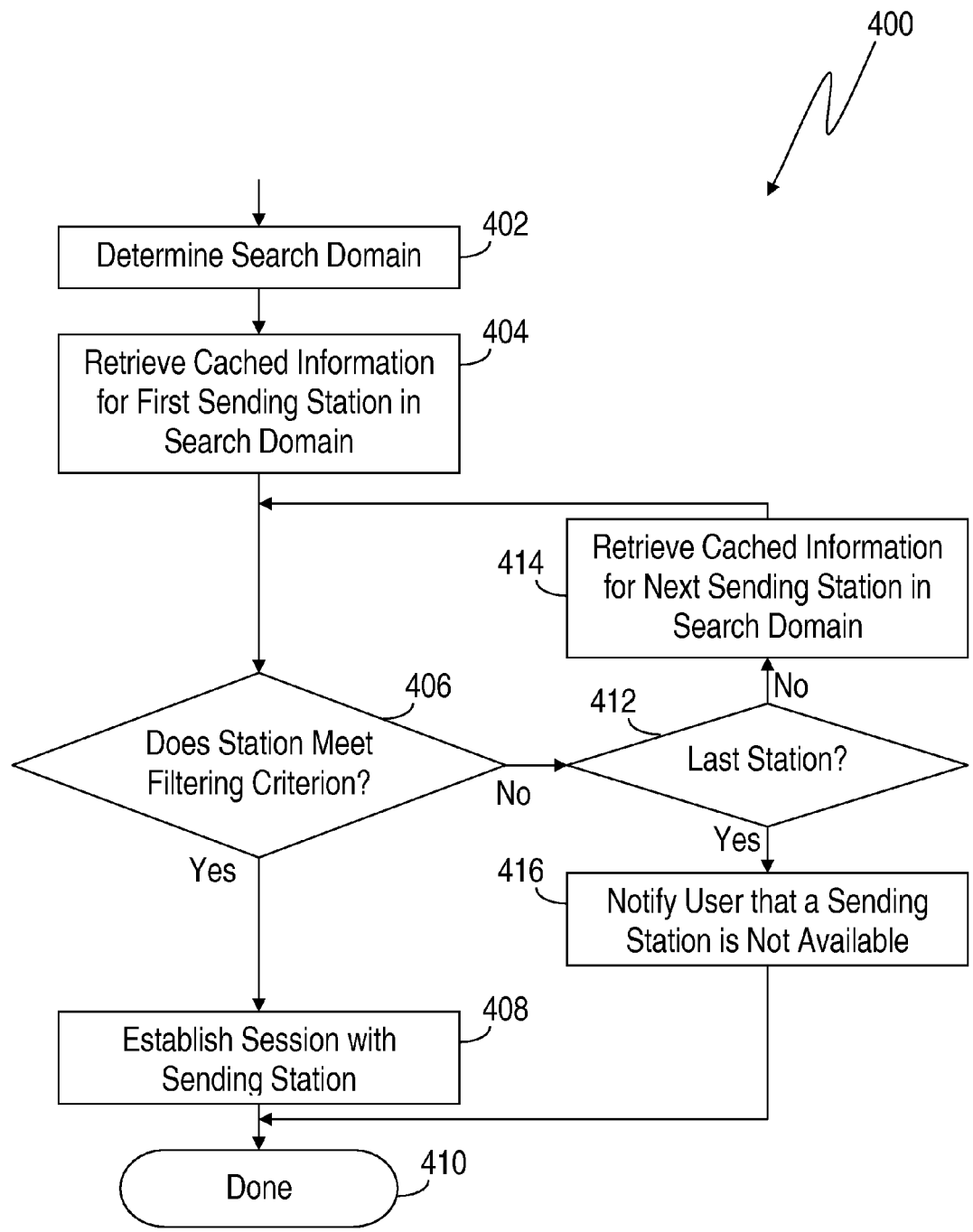
FIG. 5 shows a method implementing a peer-to-peer dynamic allocation of computer systems using locally cached information for use in a remote session, in accordance with at least some illustrative embodiments.

By dividing the functions of the receiver software 112 and the sender software 128 into sub-functions as described above, it is possible for the receiver software 112 to cause the receiver station 110 to locally cache all of the information needed for determining the search domain and applying the filtering criteria to said cached information in order to identify a suitable sending station 120-126 for a remote session. FIG. 5 shows a method 400, which is similar to method 300, except that locally cached information is used in blocks 404 and 414. The information is received from each of the sending stations 120-126 and cached by the receiving station 110 prior to performing the method 400. The information comprises the same information retrieved when a sending station 120-126 is contacted according to method 300, such as login status, hardware capabilities and loaded software. In at least some illustrative embodiments, the information is maintained in storage 114 of receiving station 110, and is updated periodically by grid client 132.

As noted above, the information needed by the receiver software 112 is acquired and cached before a user attempts to initiate a remote session. In at least some illustrative embodiments this is achieved by executing both grid client 132 and grid service 152 on each of the receiving station 110 and sending stations 120-126 respectively upon the startup of receiving station 110 and sending stations 120-126. Upon starting up, network discovery tools such as those previously described and incorporated into receiver software 112 may be used to determine which sending stations 120-126 are active on LAN 150. The status of each sending station may also be determined at that time, enabling the receiving station 110 to cache the information described above. When a user attempts to initiate a remote session, grid client 132 of receiver software 112 performs the method 400 to determine if a sending station 120-126 is available that meets the user-specified filtering criteria.

If a sending station is found, grid client 132 then causes session client 134 of receiver software 112 to execute and to initiate a remote session with the identified sending station. Grid client 132 also notifies grid service 152 of sender software 128 executing on the selected sending station that said sending station has been selected. Grid service 152 responds to the notification by causing session service 154 of the sender software 128 to be executed, thus enabling it to respond to the remote session request originated by receiver software 112 executing on receiving station 110.

The above discussion is meant to be illustrative of the principles and various embodiments of the present invention. Numerous variations and modifications will become apparent to those skilled in the art once the above disclosure is fully appreciated. For example, although the embodiments described are presented within the context of a general user remotely accessing the sending systems, at least some other illustrative embodiments exist wherein the systems and methods described are used by system administrators for remote administration of the sending systems, both individually as well as together as a distributed remote access service. Further, in at least some illustrative embodiments a separate administrative interface is provided to provide additional controls (e.g., to logoff or disconnect users). It is intended that the following claims be interpreted to embrace all such variations and modifications.

What is claimed is:

1. A method, comprising:
    identifying, by a receiving station, a filtering criterion defining a processing capability requested by the receiving station, wherein the processing capability is to be provided by a remote session host over a remote desktop session;
    identifying, by the receiving station, a plurality of sending stations that potentially satisfy the filtering criteria, wherein each of the sending stations is a remote session host couplable to the receiving station in a peer-to-peer configuration;
    evaluating, by the receiving station, processing capabilities of each of the sending stations relative to the filtering criterion;
    determining, by the receiving station, based on a result of the evaluating, whether at least one of the sending stations meets the filtering criterion; and
    establishing, by the receiving station, the remote desktop session between the receiving station and one of the sending stations for which the filtering criterion is determined to be met.

2. The method of claim 1, wherein determining whether at least one of the sending stations meets the filtering criterion further comprises selecting the filtering criterion, wherein the filtering criterion comprises at least one criterion selected from the group consisting of whether at least one of the sending stations has no users logged on, whether the user logged onto the receiving station is already logged on to at least one of the sending stations, whether hardware of at least one of the sending stations meets a minimum hardware configuration specified by the user, and whether software specified by the user is loaded on at least one of the sending stations.

3. The method of claim 1, further comprising determining a search domain comprising a list of potential remote session hosts by accessing a configuration file stored on the receiving station, the configuration file comprising a list identifying the plurality of sending stations.

4. The method of claim 1, further comprising determining, by the receiving station, a list of potential remote session hosts by obtaining a sending station list from a server, the sending station list identifying the plurality of sending stations.

5. The method of claim 1, further comprising determining, by the receiving station, a list of potential remote session hosts by building a list of sending stations based on which of the sending stations respond to a query message from the receiving station.

6. The method of claim 5, further comprising the one of the sending stations selecting the query message, wherein the query message comprises at least one type of message selected from the group consisting of a network broadcast message and a network multicast message.

7. A system, comprising
    a receiving station comprising a first processor, receiver software executes on the first processor and causes the receiving station to:
    identify a filtering criterion defining a processing capability requested by the receiving station, wherein the processing capability is to be provided by a remote session host over a remote desktop session;
    identify a plurality of sending stations that potentially satisfy the filtering criteria, wherein each of the sending stations is a remote session host couplable to the receiving station in a peer-to-peer configuration;
    evaluate processing capabilities of each of the sending stations relative to the filtering criterion;
    determine whether at least one of the sending stations meets a filtering criterion; and
    establish the remote desktop session between the receiving station and one of the sending stations for which the filtering criterion is met.

8. The system of claim 7, further comprising the one of the sending stations comprising a second processor and coupled to the receiving station in a peer-to-peer configuration, wherein sender software executes on the second processor, and wherein the sender software responds to queries from the receiver software.

9. The system of claim 7, wherein the filtering criterion comprises at least one criterion selected from the group consisting of whether at least one of the sending stations has no users logged on, whether the user logged onto the receiving station is already logged on to at least one of the sending stations, whether hardware of at least one of the sending stations meets a minimum hardware configuration specified by the user, and whether software specified by the user is loaded on at least one of the sending stations.

10. The system of claim 7, wherein the receiver software further causes the receiving station to determine a search domain comprising a list of potential remote session hosts by accessing a configuration file stored on the receiving station, the configuration file comprising a list identifying each of the plurality of sending stations.

11. The system of claim 7, wherein the receiver software further causes the receiving station to determine a list of potential remote session hosts by obtaining a sending station list from a server, the sending station list identifying the plurality of sending stations.

12. The system of claim 7, wherein the receiver software further causes the receiving station to determine a list of potential remote session hosts by building a list of sending stations based on which of the sending stations responds to a query message send by the receiving station.

13. The system of claim 12, wherein the query message comprises at least one type of message selected from the group consisting of a network broadcast message, and a network multicast message.

14. A non-transitory computer-readable medium encoded with software that causes a processor of a receiving station to:
   identify a filtering criterion defining a processing capability requested by the receiving station, wherein the processing capability is to be provided by a remote session host over a remote desktop session;
   identify a plurality of sending stations that potentially satisfy the filtering criteria, wherein each of the sending stations is a remote session host couplable to the receiving station in a peer-to-peer configuration;
   evaluate processing capabilities of each of the sending stations relative to the filtering criterion;
   determine whether at least one of the sending stations meets the filtering criterion; and
   establish the remote desktop session between the receiving station and one of the sending stations for which the filtering criterion is met.

15. The computer-readable medium of claim 14, wherein the filtering criterion comprises at least one criterion selected from the group consisting of whether at least one of the sending stations has no users logged on, whether the user logged onto the receiving station is already logged on to at least one of the sending stations, whether hardware of at least one of the sending station meets a minimum hardware configuration specified by the user, and whether software specified by the user is loaded on at least one of the sending stations.

16. The computer-readable medium of claim 14, wherein the software further causes the processor to determine a search domain comprising a list of potential remote session hosts by accessing a configuration file stored on the receiving station, the configuration file comprising a list identifying the plurality of sending stations.

17. The computer-readable medium of claim 14, wherein the software further causes the processor to determine a list of potential remote session hosts by obtaining a sending station list from a server, the sending station list identifying the plurality of sending stations.

18. The computer-readable medium of claim 14, wherein the software further causes the processor to determine a list of potential remote session hosts by building a list of sending stations based on which sending stations respond to a query message from the receiving station.

19. The computer-readable medium of claim 18, wherein the query message comprises at least one type of message selected from the group consisting of a network broadcast message and a network multicast message.

* * * * *